United States Patent [19]

Walsh et al.

[11] Patent Number: 4,658,371

[45] Date of Patent: * Apr. 14, 1987

[54] FUEL DISPENSING AND VEHICLE MAINTENANCE SYSTEM WITH ON-BOARD COMPUTER

[75] Inventors: Richard F. Walsh; James A. Franks, both of Forth Worth; Richard R. Martin, Grand Prairie, all of Tex.

[73] Assignee: Art Systems, Inc., Fort Worth, Tex.

[*] Notice: The portion of the term of this patent subsequent to Dec. 25, 2001 has been disclaimed.

[21] Appl. No.: 631,475

[22] Filed: Jul. 16, 1984

Related U.S. Application Data

[63] Continuation-in-part of Ser. No. 331,250, Dec. 16, 1981, Pat. No. 4,490,798.

[51] Int. Cl.$^4$ .................... G01D 4/14; G06F 15/20
[52] U.S. Cl. ........................ 364/550; 340/52 R; 340/825.31; 364/478; 364/510
[58] Field of Search ............. 364/424, 465, 478, 479, 364/509, 510, 550; 340/52 F, 52 R, 59, 825.31, 825.34

[56] References Cited

U.S. PATENT DOCUMENTS

| | | | |
|---|---|---|---|
| 4,400,783 | 8/1983 | Locke, Jr. et al. | 364/550 |
| 4,426,691 | 1/1984 | Kawasaki | 340/52 F |
| 4,500,868 | 2/1985 | Tokitsu et al. | 364/424 |
| 4,533,900 | 8/1985 | Muhlberger et al. | 364/424 |
| 4,562,545 | 12/1985 | Hasegawa | 364/550 |

Primary Examiner—Errol A. Krass
Assistant Examiner—Kevin J. Teska
Attorney, Agent, or Firm—James E. Bradley

[57] ABSTRACT

A method for dispensing fuel has features to prevent theft of fuel and also control maintenance of authorized vehicles. The system includes a portable memory unit which remains with each vehicle. The portable memory unit is removably connected to an on-board computer on the vehicle. The on-board computer senses certain vehicle conditions and changes through transducers carburetor settings. The on-board computer also writes into the portable memory unit a warning if any of the vehicle conditions exceed limits. At the fuel dispensing site, a data processing unit receives the portable memory unit to read from it coded information. A central processing unit is located at a central records site and connected to the remote processing unit for record storage. The remote processing unit reads from the portable memory unit a last mileage at which fuel was dispensed, and compares it to a current mileage entered by the operator into the remote processing unit. A next service mileage is also read by the remote processing unit and compared to the current mileage. If the current mileage exceeds a next service mileage or if warnings are read by the remote processing unit, the operator is notified to immediately take the vehicle to a maintenance facility for maintenance.

7 Claims, 6 Drawing Figures

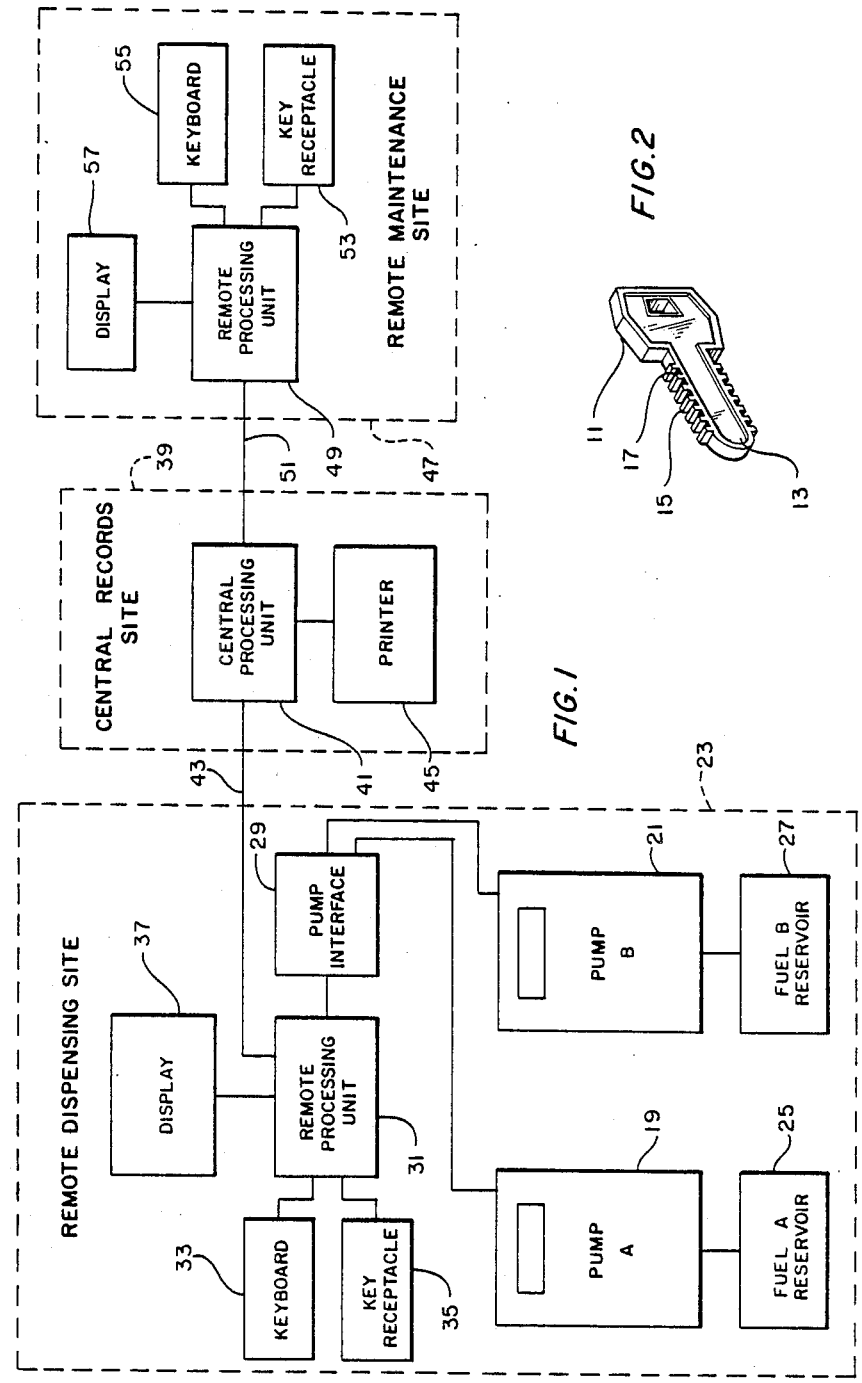

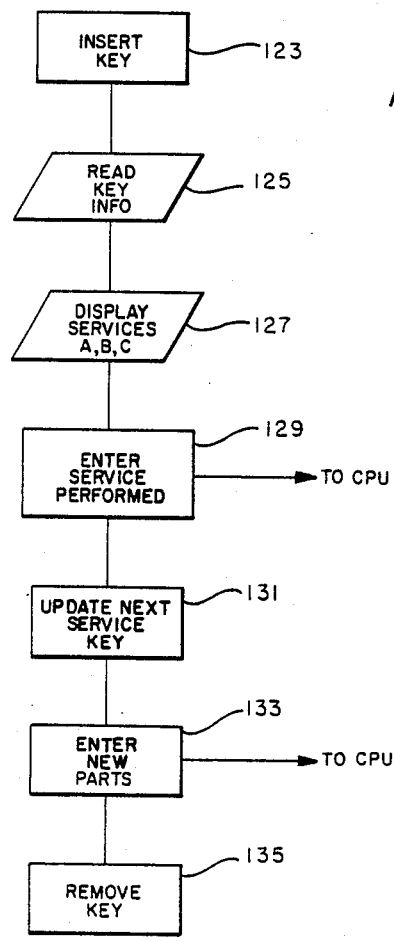

FUEL DISPENSING AND VEHICLE MAINTENANCE SYSTEM WITH ON-BOARD COMPUTER

CROSS-REFERENCE TO RELATED APPLICATION

This application is a continuation-in-part of Ser. No. 331,250, filed Dec. 16, 1981, "FUEL DISPENSING AND VEHICLE MAINTENANCE SYSTEM" U.S. Pat. No. 4,490,798.

BACKGROUND OF THE INVENTION

This invention relates in general to security systems for dispensing fuel to a motor vehicle, and in particular to a system that provides security for dispensing fuel as well as controlling maintenance of the vehicle.

Operators of a fleet of vehicles often use their own fuel dispensing sites and maintenance personnel. For example, a typical city with a population of several hundred thousand may have a large number of vehicles used by police, fire department, street and parks department, and the like. The city often will have several sites located around the city where individual operators can receive fuel for their vehicles. Usually there are one or more maintenance sites. Routine maintenance such as changing oil and lubricating the vehicle requires an operator to keep check of the current mileage and take the vehicle in for service when needed.

Security and maintenance problems are abundant in the systems. In regard to maintenance, often the operators will not have a car exclusively assigned to them, thus will be too busy and lack the feeling of responsibility necessary to assure that maintenance is performed when it is needed. Consequently, much of the maintenance performed on a vehicle results only when the vehicle needs emergency repair.

In addition to problems in regard to scheduled maintenance, breakdowns often result because of an employee failing to observe temperature and oil pressure gauges and failing to check items such as oil level, coolant level and air pressure. Computers are now available for some vehicles that monitor these conditions and others to control fuel consumption and emissions. However, the computer does not prevent further operation if a condition is out-of-bounds nor does it inform supervisory authority.

Some fleet operators, such as cities, have security systems to avoid theft of fuel. A typical security system utilizes a card that has an identification number punched into it or located on a magnetic strip. The pumps are controlled by a central processing unit located remote from the fuel dispensing site. To receive fuel, the card is inserted into a card reader at the site. This information in communicated to the central processing unit, which determines if the card is a valid card. If valid, the pump will be turned on for dispensing fuel.

There are problems with these types of sytems. It requires that a communication link always be available between the fuel dispensing site and the central processing unit, and sometimes this is not possible. Employee theft can still occur since the cards may be stolen, or the fuel may be dispensed into a vehicle other than a city vehicle. Forged cards may be undetectable in some systems, as well. Also, these security systems have no effect on the need for assuring periodic maintenance of the vehicle.

SUMMARY OF THE INVENTION

In this invention, a system is provided that provides better security that prior art systems, and controls maintenance as well. The system requires a portable memory unit, that in the preferred embodiment is in the shape of a plastic key. The key has internal electronic circuits that will store information. This information can be read and updated. External electrical contacts enable the key to be placed into a data processing unit.

Preferably, each vehicle has an on-board computer with a receptable for receiving the key. The on-board computer monitors several vehicle conditions such as oil pressure, coolant temperature, speed, and miles driven. If any of these conditions exceed selected limits considering the engine speed, a warning signal is placed in the key. Current mileage is also placed in the key.

A data processing unit is located at each fuel dispensing site. The data processing unit has an interface means for receiving the key. The data processing unit also has means for controlling the pumps. The remote data processing unit is linked by telephone or other means to a central processing unit at a site different from the remote processing unit.

Each maintenance site also has a remote processing unit. The remote processing units at the maintenance sites are capable of reading information from the key, and updating information. The key will typically have in its memory means an identification number, the mileage at which the vehicle last received fuel, the current mileage, the mileage at which the vehicle should be next serviced, and an indication of any warnings for out-of-range vehicle conditions.

To dispense fuel, the operator places his key in the data processing unit, which then checks to determine whether the identification number is valid. The fuel dispensing data processing unit reads the current mileage. If the current mileage exceeds the next service mileage required, then the operator will be notified and a notification will be written into the memory of the key. The system may include a provision whereby fuel will not be dispensed if the number of notifications exceeds a selected maximum. If the remote processing unit reads that a warning has been given of an improper vehicle condition, the system may include a provision wherein fuel will not be dispensed.

The remote processing unit monitors the fuel dispensed, and conveys this information to the central processing unit, along with the last and current mileages. The central processing unit will then be able to compute a miles per gallon. The system may have a feature for placing keys on a bad key list if the vehicle's mileage is out of selected ranges. At the maintenance site, once the next service required is performed, the mechanic enters into the key memory means the next srevice mileage or date. The mechanic can also delete warning indications once the problem has been corrected.

BRIEF DESCRIPTION OF THE DRAWINGS

FIG. 1 is a block diagram schematically illustrating the components of a fuel dispensing and maintenance system in accordance with this invention.

FIG. 2 is a perspective view of a key or portable memory unit for use with the system of FIG. 1.

FIG. 3b is a continuation of the flow chart of FIG. 3a.

FIG. 4 is a flow chart illustrating the steps performed at the maintenance site for the system of FIG. 1.

DESCRIPTION OF THE PREFERRED EMBODIMENT

Figure 3A:
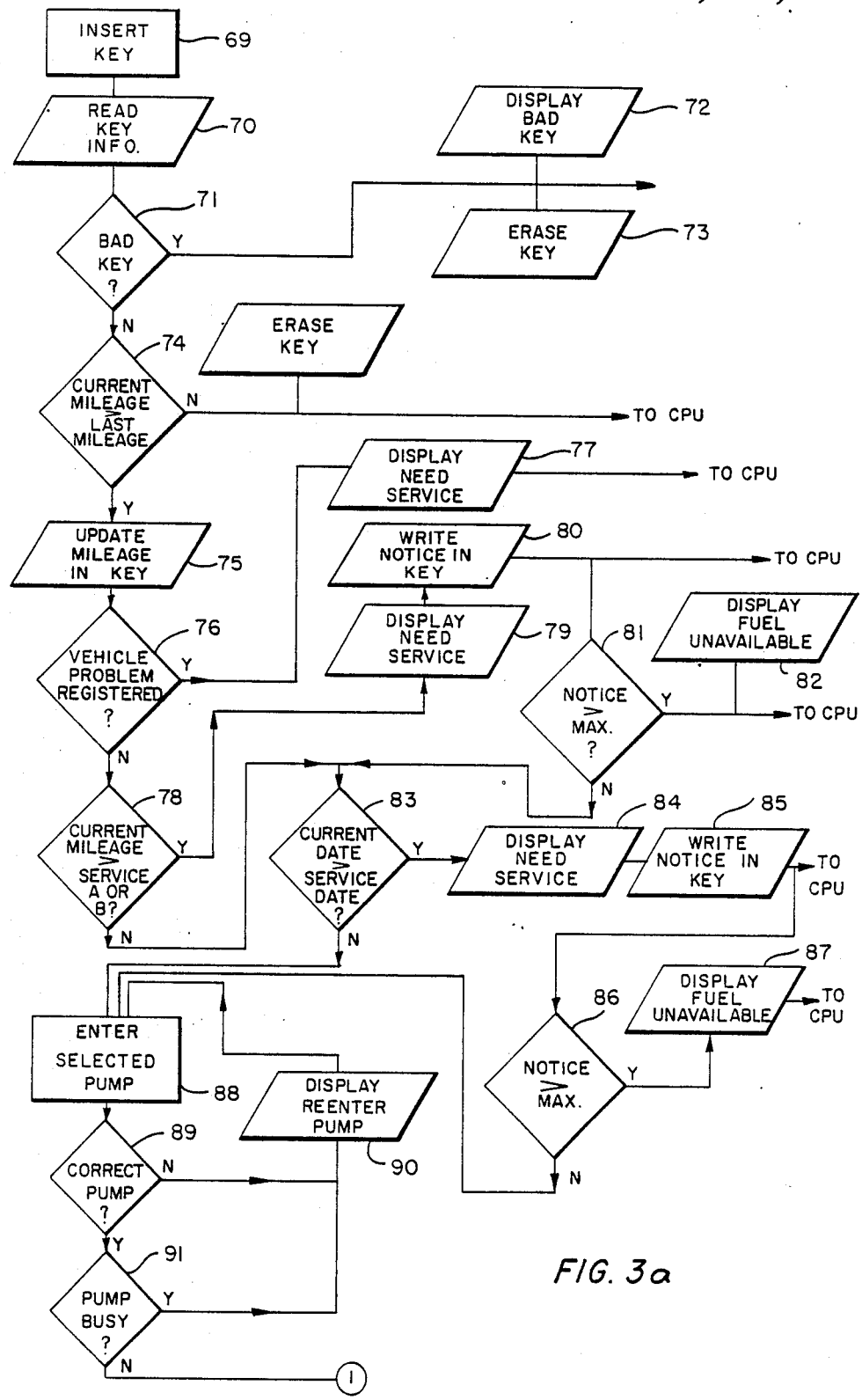
FIG. 3a is the first portion of a flow chart illustrating the steps used in obtaining fuel at the fuel dispensing site of the system of FIG. 1.

Referring to FIG. 2, the system includes for each motor vehicle a key 11. Key 11 is a commercially available device that has the general configuration of a key for conventional locks. Key 11 has a solid-state memory unit that is capable of storing more than 300 characters of information. Key 11 is constructed of plastic and has a shaft 13 containing a plurality of protruberances 15 on each edge. A metal electrical contact 17 is located between certain or all of the protruberances for making electrical contact with the internal memory. Information stored in key 11 can be retrieved, updated, or new information can be entered into the storage. Key 11 is to be used with a single vehicle, and will contain selected information concerning the vehicle. In the preferred embodiment, key 11 is manufactured by Datakey, Inc. of Minneapolis, Minn.

Referring to FIG. 1, other features of the system include one or more conventional pumps, designated pumps A and B, and indicated herein as numerals 19 and 21, located at the remote fuel dispensing site 23. Each fuel pump 19 and 21 is connected to common or separate fuel reservoirs 25 and 27. Pumps 19 and 21 are controlled by an interface unit 29 that is conventional and contains means for turning on and off the pumps, and means for monitoring the amount of fuel being dispensed as the fuel is being dispensed. Pump interface 29 is controlled by a remote processing unit 31 that is a conventional small computer capable of being programmed for making comparisons and making certain decisions. A keyboard 33 is connected to the remote processing unit 31 for entering information. A key receptacle 35 having contacts for connections with contacts 17 of key 11 (FIG. 2), is also connected to the remote processing unit 31. A display 37 is connected with the remote processing unit 31.

A central records site 39 is also included with the system. There will be only one central records site 39, while often there will be several remote dispensing sites 23. The central records site will be remote from the remote dispensing site 23, often several miles. A central processing unit 41 comprises a conventional computer for storing and manipulating data. Central processing unit 41 is connected by a communication link 43 to each remote processing unit 31. Communication link 43 may be telephone lines or it may be a special purpose line. Central processing unit 41 has a printer 45 for printing information stored within.

One or more remote maintenance sites 47 are included in the system. Remote maintenance sites 47 have service facilities for repairing and servicing vehicles. Maintenance sites 47 may be located at the same place as one of the dispensing sites 23, or at a different place. Each remote maintenance site 47 has a remote processing unit 49 connected by a communication link 51 to the central processing unit. Communication link 51 may be a telephone line or a special purpose line. The remote processing unit 49 is a computer having capabilities to read and to enter information in key 11 through a key receptacle 53 connected to it. A keyboard 55 is connected to remote processing unit 49. A display 57 is connected to the remote processing unit 49.

Figure 5:
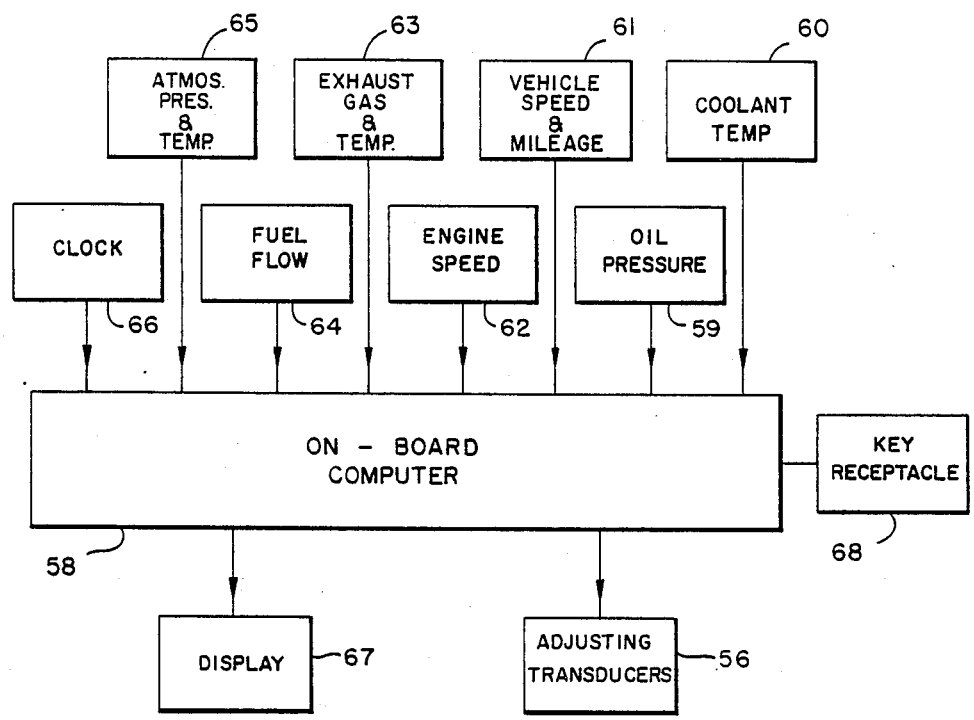
FIG. 5 is a block diagram of the on-board processing system for the vehicle.

The vehicle has an on-board processing means shown in FIG. 5 for sensing vehicle conditions and providing a warning if the condition exceeds selected bounds. The processing means includes an on-board computer 58 of a conventional type. Certain vehicles now being sold have computers of this nature, which have means to sense certain conditions and make adjustments in the carburetor with transducers 56 to improve fuel economy. Computer 58 also has sensors that preferably monitor the following: oil pressure 59, coolant temperature 60, vehicle speed and miles traveled 61, engine speed 62, exhaust gas conditions 63, fuel flow 64, atmospheric pressure and temperature 65, and time 66. Information from these sensors is processed by computer 58. Transducers 56 are actuated by the computer 58 to change the carburetor settings for better fuel economy.

The on-board computer 58 also provides a warning to a display 67 if selected limits of the conditions sensed are exceeded. For example, if coolant temperature is too high, a warning is displayed. If oil pressure in relation to engine speed and temperature is too low or high, a warning is displayed.

A key receptacle 68 identical to key receptacles 35 and 53 of FIG. 1 is connected to computer 58. Key receptacle 68 receives key 11, and preferably the vehicle is inoperable without key 11 being inserted in receptacle 68. Computer 58 writes into the memory of key 11 warnings given and the type of warning. Preferably the warning indication remains in key 11 even if the adverse condition disappears, unless the warning indication is later removed at maintenance site 47. Computer 58 also writes current mileage into the memory of key 11. Other information can be written into key 11 by computer 58, if desired, such as top vehicle speed and maximum fuel flow.

Figure 3B:
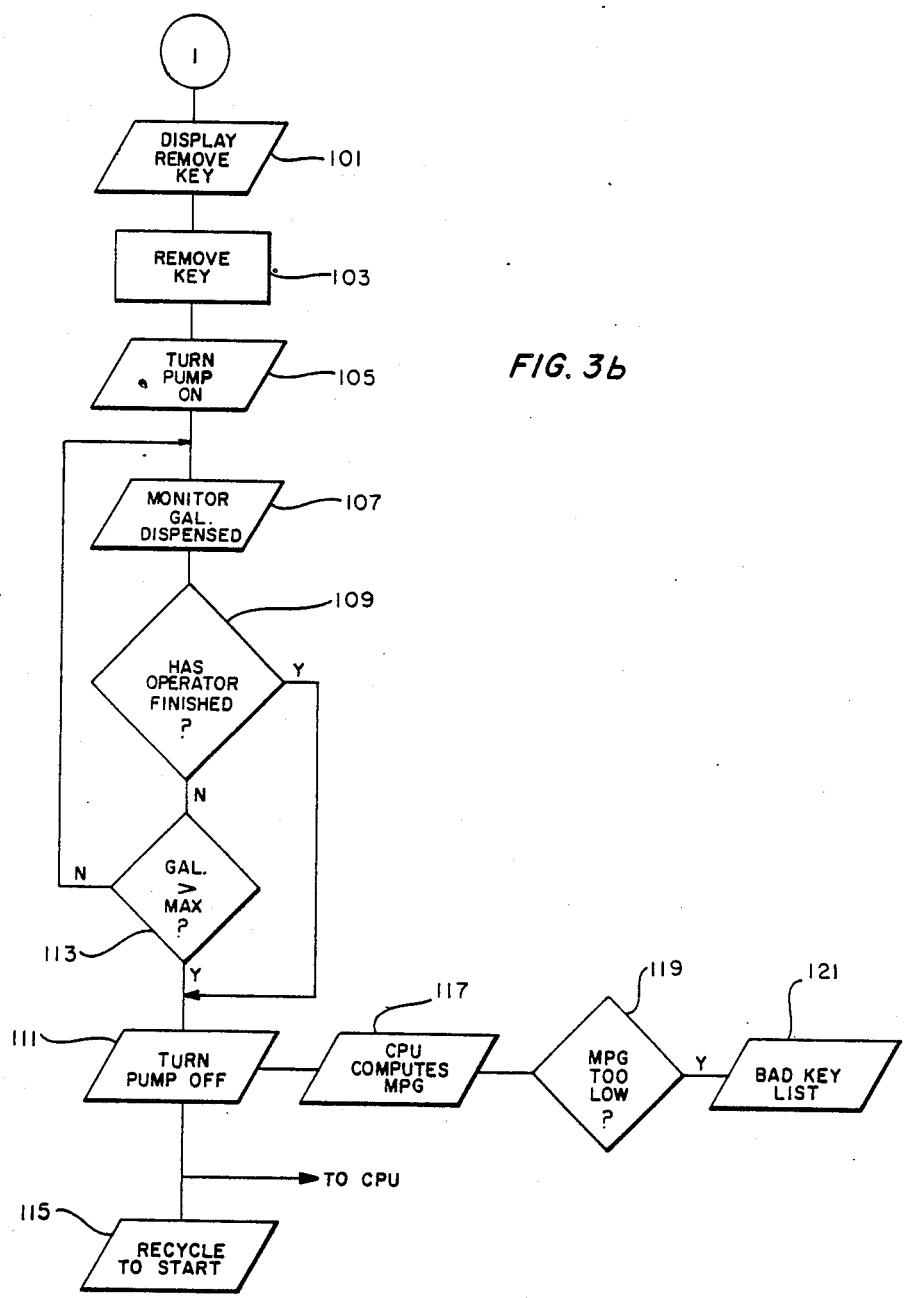

The operation of the remote processing units 31 and 49, the central processing unit 41, and on-board computer 58 can best be explained by referring to FIGS. 3a and 3b. An operator of a vehicle needing fuel proceeds to a remote dispensing site 32, removes key 11 from the on-board computer receptacle 68 (FIG. 5) then inserts key 11 into key receptacle 35. (FIG. 1). This step is indicated by the numeral 69 in FIG. 3a. Once inserted, the electrical contacts 17 (FIG. 2), of key 11 will be connected to the remote processing unit 31. As indicated by block 70 of FIG. 3a, the remote processing unit 31 will read the information contained in the memory means of key 11. This information preferably includes, but is not limited to the following:

(1) An identification number for the key and vehicle;
(2) The mileage of the vehicle when fuel was last dispensed;
(3) The current mileage;
(4) The mileage at which service A is required.
(5) The mileage at which service B is required;
(6) The date at which service C is required;
(7) Any warnings given by computer 58;
(8) The fuel tank capacity; and
(9) Type of fuel used.

Service A mileage will likely be the next mileage at which a frequent service is needed, such as lubricating the vehicle. Service B mileage is likely a service that occurs less frequently, such as packing the front wheel bearings of the vehicle. Service C date will be a date at which service such as lubrication is necessary, even if the mileage for this service hasn't been reached. The warning would likely be an indication that the coolant temperature had been excessive or oil pressure inadequate.

As indicated by block 71, the program of the remote processing unit 31 causes it to compare the key identification number with a list of identification numbers to determine whether or not the key is valid. The list is preferably stored in the remote processing unit 31. Also, the list may be of bad or invalid keys, or the list may be of valid keys. Assuming that the list is a list of bad key numbers, then it will check to determine whether or not the key of the operator is on that list. If so, the remote processing unit 31 is programmed to display "Bad Key" as indicated by block 72, then erase all of the information on the key as indicated by numeral 73, then notify the central processing unit 41 of having taken this step.

The remote processing unit 31 will also read the current mileage from key 11. If the vehicle does not have an on-board computer 58, the driver will enter current mileage with the keyboard 33 (FIG. 1). A comparison then is made, as indicated by clock 74, of the current mileage with respect to the last mileage that the vehicle received fuel. If the current mileage does not exceed the last mileage, then there is a malfunction in the system or the driver is fraudulently attempting to obtain fuel. In any case the central processing unit 41 is notified of this abnormality, and the key is erased as indicated with the remote processing unit 31. Display 37 will indicate the refusal to provide fuel.

Assuming that the current mileage is greater than the last mileage, the remote processing unit 31 will then enter or write the new mileage at which fuel is dispensed in the memory means of key 11, as indicated by block 75. The old mileage will be deleted. The remote processing unit 31 then determines if a warning had been entered by on-board computer 58 into key 11, as indicated by block 76. If so, the remote processing unit 31 will display the service needed, as shown by block 77. The central processing unit is notified, also. The remote processing unit 31 may refuse fuel if this step is desired in the system. If so, the operator must proceed to a remote maintenance site immediately to have the problem corrected and the warning indication deleted from key 11.

Remote processing unit 31 then compares the current mileage with the service mileages A or B, as indicated by block 78. If the current mileage exceeds one of the mileages of service A or B that has been stored in the memory means of key 11, then remote processing unit 31 causes its display 37 to display "Vehicle Needs Service" as indicated by block 79. At the same time, the remote processing unit 31 will write or enter into the memory means of key 11 that the operator has been notified of a sevice requirement, indicated by block 80. The central processing unit 41 will receive information that a notice has been given to the operator. If desired in the system, as indicated by block 81, the remote processing unit 37 may then compare the number of notifications in key 11 with a maximum number, such as three. If the number of notices is three or more, the remote processing unit 31 may cause display 37 to display that fuel will be unavailable until service is performed, as indicated by block 82. The central processing unit 41 will be informed of this step.

If the number of notices is less than the maximum, or if the current mileage is less than the next service mileage, then the next step performed, as indicated by block 83, is a comparison of the current date with the service C date. If so, remote processing unit 31 will cause its display 37 to display that service is needed, as indicated by block 84. Remote processing unit 31 will also write a notice into the memory of key 11, as indicated by block 85, and inform central processing unit 41. The remote processing unit 31 may also compare the total number of notices with a maximum selected, indicated by block 96. If greater than maximum, the operator will be notified by display 37 that fuel is unavailable until service is performed, as shown by block 97. This step will be transmitted to the central processing unit 41.

Assuming that the number of notices for services A, B and C do not exceed the maximum, or the service dates and mileages are not due, the remote processing until 31 will then request the operator to enter the selected pump 19 or 21 (FIG. 1) as indicated by block 88. Block 89 indicates that the remote processing unit 31 then determines if the pump selected is the one with the correct fuel, the type of fuel being provided by key 11. If wrong, block 90 indicates that the driver is requested to select a pump again.

Block 91 indicates that the remote processing unit 31 will determine whether or not the pump selected is busy at the moment. If so, display 37 will display that the pump is busy according to block 90, and the operator will be requested to enter his selected pump at a later time. If the pump selected is not busy, remote processing unit 31 causes the display 37 to display to the operator to remove the key, indicated by block 101 of FIG. 3b. The operator removes key 11 according to block 103, inserts it in the on-board computer receptacle 68, and proceeds to one of the pumps 19 or 21, which is turned on at that time by pump interface 29, according to block 105.

As the driver fills his tank, pump interface 29 will monitor the gallons being dispensed, according to block 107 and continuously provide this information to the remote processing unit 31. If the operator stops pumping fuel, as indicated by block 109, the remote processing unit 31 turns the pump off according to block 111. If the operator has not finished, and the gallons being dispensed exceed the maximum tank capacity read from the memory of key 11 previously, remote processing unit 31 will turn the pump off once it begins to exceed maximum tank capacity, as indicated by block 113. This indicates that there is an error in the system, or the driver is using a vehicle that has a larger tank than the actual vehicle assigned to the key.

Once the pump is turned off, the remote processing unit 31 and pump interface 29 are recycled to start, according to block 115. Also, the turning off of the pump causes the remote processing unit 31 to transmit to the central processing unit 43 the total gallons dispensed. The central processing unit, which also receives the last mileage and current mileage, then according to block 117 computes the miles per gallon that the vehicle achieved during the last tank of fuel. Then, if desired, the central processing unit can made a comparison with a minimum figure of miles per gallon, indicated by block 119. If the figure is too low, this may indicate that fuel is being dispensed in an unauthorized vehicle, causing the central processing unit to place the identification number of that particular key 11 and vehicle on the bad key list. The bad key list is subsequently transmitted back to the remote processing unit 31 to erase all information from the key the next time the driver seeks to obtain additional fuel. This is indicated by block 121.

The various information forwarded to the central processing unit 41 can be forwarded at different intervals, or can remain stored in the remote processing unit 31 and forwarded at one time or even at a later time during the day. If the bad key list is stored in the remote processing unit 31, it does not need any signals from the central processing unit 41 to enable it to dispense fuel. Consequently, if communication link 43 is interrupted, fuel can still be dispensed until the repair is made.

In the normal course, once a driver is notified that a service A, B, or C is needed, he will proceed to the remote maintenance site 47 before returning to the remote dispensing site 23 for a new tank of fuel. Normally, the driver will leave the vehicle at the remote maintenance site 47. The key 11 will stay with the vehicle, where the mechanic will then insert the key into the key receptacle 53 (FIG. 2) as indicated by block 123 of FIG. 4. Block 125 indicates that the remote processing unit 49 (FIG. 2) will then read the selected information contained in the memory means of key 11. It will display to the mechanic on display 57 the services A, B, and C that are next required, as shown in block 127 of FIG. 4. The mechanic, by viewing the actual mileage on the vehicle, will determine which of the services are needed. The mechanic can also determine by the display what type of warning, if any, had been entered by on-board computer 58.

Block 129 indicates that he performed the services and entered this indication into remote processing unit 49. Remote processing unit 49 notifies the central processing unit 41 of the service performed. If desired, the hours that the mechanic spent or other labor cost information can be supplied to the central processing unit 41 at this time. The mechanic, by again using keyboard 55, then updates the next service A, B, or C needed for the vehicle, replacing the old information in the memory of key 11 with this new information, this step being indicated by block 131. The mechanic also deletes the warning indication, if any.

If desired, the central processing unit can also have facilities for storing information concerning the parts used, the costs, and inventory. If so, block 133 indicates that the mechanic will enter coded information through keyboard 55 into the remote processing unit 49, for subsequent transmittal to central processing unit 41. Block 135 indicates that the mechanic removes the key after completing the desired service. The next time the vehicle will receive fuel, the new information concerning service will be retrieved by the remote processing unit 31.

An invention having significant advantages has been provided. Use of a portable memory unit, such as the key described, which will not only provide information but can be updated in the field, provides greater security than the prior art systems and also provides means for controlling maintenance of the vehicle. The remote processing unit located at the remote dispensing site speeds up dispensing of fuel since it will not be necessary to check validity and receive other information from the central processing unit before dispensing fuel. The remote processing unit also avoids having to cease dispensing fuel in case of a breakdown in the communication link to the central processing unit.

Maintaining records of the transactions in the central processing unit provides a security check for users that are using an excessive amount of fuel or failing to have their vehicles maintained. The remote processing unit at the maintenance site enables a mechanic to update the information in the portable memory unit, and also provides a means for obtaining better cost information about the operation of particular vehicles, and the need for maintaining particular parts and inventory. The linking of a key with memory between an on-board computer and the remote processing unit prevents an operator from driving a vehicle that has conditions indicating immediate maintenance is needed.

While the invention has been shown in only one of its forms, it should be apparent to those skilled in the art that it is not so limited, but is susceptible to various changes and modifications without departing from the spirit of the invention.

We claim:

1. A method of dispensing fuel and providing maintenance information for a motor vehicle, comprising:

providing with the vehicle a portable memory means for storing, retrieving and updating selected data;

providing with the vehicle an on-board processing means for sensing at least one vehicle condition, and for poviding a warning in the on-board processing means should the condition exceed selected bounds, the on-board processing means having a receptacle means for releasably receiving the memory means and storing the data and any warnings in the memory means;

inserting the memory means into the receptacle means of the on-board processing means and storing in the memory means the data and any warnings received from the on-board processing means;

providing at a fuel dispensing site a remote processing unit having receptacle means for releasably receiving the memory means, providing with the remote processing unit a means for reading and updating the data in the memory means, and providing with the remote processing unit an interface means for controlling a pump to dispense fuel;

removing the memory means from the receptacle means of the on-board processing means and inserting the memory means into the receptacle means of the remote processing unit, then reading with the remote processing unit from the memory means the data and any warnings;

notifying the vehicle operator with the remote processing unit of service needs if a warning has been entered in the memory means;

if a warning has not been entered in the memory means, turning on the pump with the remote processing unit; and if a warning has been entered in the memory means, refusing with the remote processing unit to turn on the pump.

2. A method of dispensing fuel and providing maintenance information for a motor vehicle, comprising:

providing with the vehicle a portable memory means for storing, retrieving and updating selected data including a next service mileage;

providing with the vehicle an on-board processing means for sensing at least one vehicle condition, and for providing a warning in the on-board processing means should the condition exceed selected bounds, providing with the on-board processing means a means for sensing current mileage of the vehicle, the on-board processing means having a receptacle means for releasably receiving the memory means and storing current miles and any warnings in the memory means;

inserting the memory means into the receptacle means of the on-board processing means and storing in the memory means the current mileage and any warnings;

providing at a fuel dispensing site a remote processing unit having receptacle means for releasably receiving the memory means, providing with the remote processing unit a means for reading and updating the data in the memory means, and providing with the remote processing unit an interface means for controlling a pump to dispense fuel and for the monitoring the fuel dispensed;

removing the memory means from the receptacle means of the on-board processing means and inserting the memory means into the receptacle means of the remote processing unit, then reading with the remote processing unit from the memory means current mileage of the vehicle, an identification number, a next service mileage for the vehicle and any warnings;

verifying with the remote processing unit that the identification number is a valid number;

comparing with the remote processing unit the current mileage with the next service mileage and notifying the vehicle operator of service needs if the current mileage exceeds the next service mileage, and if any warnings have been entered in the memory means;

if the identification number is valid, turning on the pump and monitoring with the remote processing unit the amount of fuel dispensed; and removing the memory means from the receptacle means of the remote processing unit and re-inserting the memory means into the receptacle means of the on-board processing unit.

3. The method according to claim 2 further comprising:

refusing with the remote processing unit to turn on the pump if any warnings have been entered in the memory means.

4. The method according to claim 3 wherein the on-board processing means disables the vehicle from operation unless the memory means is inserted into the receptacle means of the on-board processing unit.

5. The method according to claim 2, further comprising the steps of:

providing a central processing unit at a central records site remote from the fuel dispensing site with storage means for storing data transmitted to it by the remote processing unit; and transmitting with the remote processing unit to the central processing unit a message that the remote processing unit has notified the operator of service needs and the warning, if any.

6. A method of dispensing fuel and providing maintenance for a motor vehicle, comprising:

providing with the vehicle a key having internal memory means for storing, retrieving and updating selected data of the vehicle;

providing with the vehicle an on-board processing means for sensing current mileage and at least one vehicle condition, and for providing a warning in the onboard processing means should the condition exceed selected bounds, the on-board processing means having a receptacle means for releasably receiving the key and storing the current mileage and any warnings in the key;

inserting the key into the receptacle means of the on-board processing means and storing in the memory means the current mileage and any warnings;

providing at a fuel dispensing site a remote processing unit having recpetacle means for releasably receiving the key and for reading, comparing and undating the data in the memory means, and providing with the remote processing unit an interface means for controlling a pump to dispense fuel and for monitorting the fuel dispensed;

removing the key from the receptacle means of the on-board processing means, and inserting the key into the remote processing unit and reading with the remote processing unit from the memory means an identification number, a current mileage, a last mileage at which fuel was dispensed, a next service mileage for the vehicle and any warnings;

verifying with the remote processing unit that the idenfitication number is a valid number;

comparing with the remote processing unit the next service mileage with the current mileage and notifying the vehicle operator of service needs if the current mileage exceeds the next service mileage, and if a warning has been entered in the memory means; and turning on the pump with the remote processing unit if the identification number if valid and monitoring with the remote processing unit the amount of fuel dispensed.

7. The method according to claim 6, further comprising:

updating in the memory means the last mileage at which fuel was dispensed with the current mileage by using the remote processing means.

* * * * *